3,454,655
CONVERSION OF ALLYL ALCOHOL TO GLYCEROL
Hsiang-Peng Liao, Glen Burnie, Lawrence Alfred Smith, Jr., Pasadena, and William B. Tuemmler, Catonsville, Md., assignors to FMC Corporation, New York, N.Y., a corporation of Delaware
No Drawing. Filed Jan. 11, 1966, Ser. No. 519,951
Int. Cl. C07c 29/02
U.S. Cl. 260—635　　　　　　　　　　　　　8 Claims

ABSTRACT OF THE DISCLOSURE

This application discloses a process for preparing glycerol comprising reacting an aqueous solution of allyl alcohol, with a solution of peracetic acid in an organic solvent having a boiling point below that of glycerol and being partly soluble in water, at temperatures between 20° C. and 110° C. to produce glycerol, and recovering the glycerol from the reaction mixture.

---

It is an object of the present invention to provide an improved process for preparing glycerol from allyl alcohol which gives yields approaching quantitative.

It is also an object of the present invention to provide a one step process for preparing glycerol from allyl alcohol.

Other objects and advantages of this invention will in part be obvious and will in part become apparent from the description herein.

In accordance with the invention, glycerol is prepared by reacting an aqueous solution of allyl alcohol, with peracetic acid in an organic solvent, which is at least partially water soluble, to substantially complete conversion of the minor reactant, at temperatures between about 20° C. and the boiling point of the system. At the completion of the reaction the glycerol is recovered by stripping off the organic solvent, acetic acid and water, to leave a high boiling portion containing glycerol. The high boiling portion is a flash distilled under a vacuum to obtain crude glycerol, generally having a purity greater than 90%.

The preparation of glycerol from the reaction of allyl alcohol with peracetic acid in an organic solvent, in a one step process appears to involve the epoxidation of the allyl alcohol to glycidol and conversion of the peracetic to acetic acid, followed by substantially immediate hydroxylation of the glycidol. The overall reactants are allyl alcohol, peracetic acid and water, which result in the formation of glycerol and acetic acid. The reaction mixtures utilized may contain excesses of the various reactants.

To carry out the process, the allyl alcohol is used in an aqueous solution containing between about 5 to 200 moles of water per mole of allyl alcohol. The preferred concentrations are 10 to 100 moles of water per mole of allyl alcohol, with economic optimum process conditions obtained with a ratio of between 40 to 1 and 60 to 1.

The peracetic acid is used in an organic solvent or mixed solvent, at least partially soluble in water, having a boiling point below about 110° C. These solvents are preferably low molecular weight ketones, esters, ethers, alcohol, such as acetone, methyl ethyl ketone, ethyl acetate, isopropyl acetate, methylal, isopropanol, dioxane, methanol, alone or in admixture with water insoluble solvents such as chloroform, carbon tetrachloride, and Freons. The peracetic acid solution should contain about 15% to 40% and preferably between 23% to 27% of peracetic acid. The solution may also contain between about 5% and 10% acetic acid. Thus, the fundamental requirement of the solvent is that it have adequate solvent power for the peracetic acid, at least to form a 15% solution, and that it be used in the reaction zone in an amount such that at the commencement of the reaction the concentration of peracetic acid in the solvent is in the range between 15% and 40% by weight. It appears that by having the peracetic acid in the inert solvent a moderating and inhibiting effect is obtained. Conversion of the allyl alcohol into undesirable ethers of glycerol is inhibited. By following the technique, generally the conversion of the allyl alcohol to undesired by products is kept to less than 10%. While we prefer to operate at temperatures below about 110° C., broadly the upper temperature of the reaction is limited by the boiling point of the solvent. It should have a boiling point sufficiently below that of glycerol to make ultimate separation by distillation technically easy and effective. A 50°C.–100° C. difference is ample.

Since allyl alcohol and peracetic acid react in a one to one molar ratio and reaction occurs in the presence of excess of either of the reactants, the operator has some latitude. It is generally preferred to have an excess of allyl alcohol, but the ratio of allyl alcohol to peracetic acid may be within the range of 0.5:1 to 4:1. Preferably it is in the range of 1.3:1 and 2:1.

The reaction occurs over a relatively broad temperature range, e.g. 20° C. to 110° C. It is preferably carried out in the range of between 50° C. and 100° C., and optimally between 50° C. and 70° C. Lower reaction rates are obtained at lower temperatures. The reaction takes place readily at atmospheric pressure which is preferred for convenience. However, it may also be conducted at reduced pressure or at elevated pressure. Under the preferred conditions, the reaction essentially is completed, and completion is noted by disappearance of peracetic acid from the reaction mixture, in about 2 to 8 hours. These times have been observed in batch experiments and semi-continuous experiments such as those illustrated by the procedure of Example I.

It is contemplated that the operative process time might be varied considerably from this, particularly in a continuous process involving recycling of unconverted reactants. It should be noted that the preferred condition is to conduct the reaction with excess allyl alcohol to disappearance of peracetic acid, thereby making recycling of allyl alcohol the step to follow in repetition of the process.

When the hydroxylation is completed, the reaction mixture is fractionated and the organic solvent stripped. A second cut is then usually taken to produce a mixture containing water, residual solvent, acetic acid, and unreacted allyl alcohol if any remains. Any remaining acetic acid is then stripped under reduced pressure leaving glycerol and residual high boiling components which are distilled under vacuum to obtain the crude glycerol. Alternatively, the acetic acid can be extracted from the aqueous solution with a solvent such as alkyl acetate or an alkyl ether and the glycerol recovered by evaporation of the water phase. The residues are largely glycerol ethers. The crude glycerol typically contains: 90 to 93% glycerol; some ester product or products of allyl alcohol designated "monoacetin" in amount between about 2 and 6%; and minor amounts, generally less than 1½%, of diglyceryl ether, and acetic acid. When desired, a more highly refined glycerol may be obtained by conventional purification techniques.

The process of the invention is further illustrated by the following examples. All parts and percentages are by weight.

Example I

The reaction was carried out in a five-liter, five-necked flask, fitted with two separatory funnels, a reflux condenser, a thermometer and a stirrer. Acetone, 100 milliliters, was placed in the flask. 980 grams of a peracetic acid in acetone solution containing 2.5 moles of peracetic acid and a small amount of acetic acid, and an aqueous mixture containing 1500 milliliters of water and 193 grams (3.25 moles) of 98% allyl alcohol were placed in the respective separatory funnels, and then concurrently passed into the flask with stirring over a period of about one hour during which time the temperature of the flask was kept at 54–56° C. The mixture was stirred at 54–55° C. for an additional 3.5 hours, after which time 2.43 moles (97%) of the peracetic acid and 2.32 moles of the allyl alcohol had disappeared.

The reaction mixture was then stripped to remove acetone, acetic acid and water, and the residue purified with an ion exchange resin and with an activated charcoal. The residue passed the RCS (Readily Carbonizable Substances) test. The mole ratio of glycerol to diglyceryl ether was 20 to 1. The yield of glycerol based on allyl alcohol consumed was 90%.

Example II

A five-liter, four-necked flask, fitted with a separatory funnel, a reflux condenser, a thermometer, and a stirrer was used. 193 grams (3.25 moles) of 98% allyl alcohol, and 2000 milliliters of water were placed in the flask. Then 980 grams of peracetic acid solution (2.5 moles) in acetone was added over a period of ½ hour. The mixture was then stirred for three hours while the temperature was held at 55–58° C. The reaction mixture was stripped to remove acetone, water, allyl alcohol and acetic acid, and then the high boiling fraction was flash distilled under vacuum to obtain 204.1 grams of crude glycerol and 12.7 grams of residue, essentially diglycerol ether. The yield of glycerol based on allyl alcohol conversion exceeded 90%.

Example III

A two-liter, four-necked round-bottom flask, fitted with a separatory funnel, a reflux condenser, a thermometer and a stirrer was used. 77 grams (1.3 moles) of 98% allyl alcohol, 500 milliliters of distilled water, and 500 milliliters of acetone were placed in the flask. Then 480 milliliters of peracetic acid (76 grams) in acetone solution was added over a period of ½ hour. The mixture was allowed to stand overnight (15 hours) and then heated at 62–65° C. for 1.5 hours, after which 98% disappearance of peracetic acid was observed. The reaction mixture was stripped to remove acetone, allyl alcohol, water and acetic acid, and then the high boiling portion was flashed under vacuum to obtain crude glycerol (75.6 grams) and a residue (8.2 grams). The crude glycerol contained 92.9% glycerol. The yield of glycerol, based on allyl alcohol conversion was above 90%.

The reaction appears to involve epoxidation of the unsaturated bond of allyl alcohol and suppression of esterification of glycerol and more important the suppression of by product formation which is believed to result from glycidol reaction with itself or with glycerol.

Examples IV–XIII

Using the same procedure as that of Example I, the synthesis can be carried out by substituting for acetone: methyl ethyl ketone, methylal, isopropanol, dioxane, methanol, or their mixture or mixtures of these with ethyl acetate, isopropyl acetate, chloroform and carbon tetrachloride. The presence of the solvent in the reaction zone and its use to carry the peracetic acid appears to have a repressive effect upon side reactions to the extent that we find we easily obtain yields of 90% glycerol or more, based on allyl alcohol conversion. That is, the side reaction products are held to 6–8% or less. Recovery of the glycerol is favored by using solvents boiling at temperatures below about 1100° C., but solvents boiling below glycerol are useful.

Glycerol is too common a chemical to require elaborate indication of its usefulness. It finds use in various grades, from relatively crude to chemically pure glycerol. The purer grades find uses in the cosmetic and toiletry industries and as humectants, etc. to a list which can be expanded endlessly.

Although the invention has been described in connection with specific embodiments, it is to be understood that it includes all modifications and variations that come within the scope of the appended claims.

What is claimed is:

1. The process for preparing glycerol comprising reacting at temperatures between 50° C. and 100° C. (a) an aqueous solution of allyl alcohol containing between 5 and 200 moles of water per mole of allyl alcohol with (b) peracetic acid dissolved in acetone, the mole ratio of the allyl alcohol to the peracetic acid being between about 0.5:1 to 4:1, to produce glycerol, and then recovering the glycerol from the reaction mixture.

2. The process of claim 1 wherein the peracetic acid solution contains between about 15% and 40% of peracetic acid.

3. The process of claim 1 wherein the reaction temperature is between about 50° C. and 70° C., and wherein the aqueous solution contains between 10 and 100 moles of water per mole of allyl alcohol.

4. The process of claim 3 wherein the aqueous solution contains between 35 and 60 moles of water per mole of allyl alcohol.

5. The process of claim 1 wherein the ratio of allyl alcohol to peracetic acid is between 1.3:1 and 2:1.

6. The process of claim 5 wherein the peracetic acid solution also contains between 5% and 10% acidic acid.

7. The process of claim 5 wherein the peracetic acid solution contains between 23% and 27% peracetic acid.

8. The process of claim 6 wherein the peracetic acid solution contains between 23% and 27% peracetic acid.

References Cited

UNITED STATES PATENTS

| | | |
|---|---|---|
| 2,414,395 | 1/1947 | Milas. |
| 2,613,223 | 10/1952 | Young. |
| 2,776,301 | 1/1957 | Payne et al. |
| 3,155,638 | 11/1964 | Mueller et al. |
| 3,182,008 | 5/1965 | Heywood et al. |

FOREIGN PATENTS

| | | |
|---|---|---|
| 686,269 | 5/1964 | Canada. |

LEON ZITNER, *Primary Examiner.*

J. E. EVANS, *Assistant Examiner.*

U.S. Cl. X.R.

260—541, 615, 637

PO-1050
(5/69)

UNITED STATES PATENT OFFICE
CERTIFICATE OF CORRECTION

Patent No. 3,454,655  Dated July 8, 1969

Inventor(s) Hsiang-Peng Liao, Glen Burnie, Lawrence Alfred Smith, William Tuemmler It is certified that error appears in the above-identified patent and that said Letters Patent are hereby corrected as shown below:

Column 1, line 42, change "is a flash" to read: "is flash".

Column 1, line 70, change "23% to 27%" to read: "23% and 27%".

Column 4, line 1, change "mixture or mixtures" to read: "mixtures or mixtures".

Column 4, line 10, change "1100°C" to read: "110°C".

Column 4, line 25, change "between 5 and 200" to read: "between about 5 and 200".

SIGNED AND
SEALED
AUG 11 1970

(SEAL)
Attest:

Edward M. Fletcher, Jr.
Attesting Officer

WILLIAM E. SCHUYLER, JR.
Commissioner of Patents